(12) United States Patent
Cho et al.

(10) Patent No.: US 8,770,820 B2
(45) Date of Patent: Jul. 8, 2014

(54) BACKLIGHT ASSEMBLY AND DISPLAY APPARATUS HAVING THE SAME

(75) Inventors: Joo Woan Cho, Asan-si (KR); YongWoo Lee, Suwon-si (KR)

(73) Assignee: Samsung Display Co., Ltd. (KR)

( * ) Notice: Subject to any disclaimer, the term of this patent is extended or adjusted under 35 U.S.C. 154(b) by 373 days.

(21) Appl. No.: 13/035,088

(22) Filed: Feb. 25, 2011

(65) Prior Publication Data

US 2011/0216556 A1 Sep. 8, 2011

(30) Foreign Application Priority Data

Mar. 3, 2010 (KR) ........................ 10-2010-0019112

(51) Int. Cl.
*F21V 7/04* (2006.01)

(52) U.S. Cl.
USPC ............ 362/618; 362/632; 362/633; 362/634

(58) Field of Classification Search
USPC .......................................... 362/618, 632–634
See application file for complete search history.

(56) References Cited

U.S. PATENT DOCUMENTS

| 6,773,127 B2 * | 8/2004 | Kao ............................... 362/627 |
| 6,847,417 B2 * | 1/2005 | Kim ................................ 349/58 |
| 6,867,827 B2 | 3/2005 | Cha et al. |
| 6,919,937 B2 * | 7/2005 | Kim et al. ........................ 349/58 |
| 7,241,041 B2 * | 7/2007 | Lo et al. ......................... 362/633 |
| 7,248,307 B2 * | 7/2007 | Han ................................. 349/58 |
| 7,295,260 B2 * | 11/2007 | Harayama et al. .............. 349/61 |
| 7,374,325 B2 * | 5/2008 | Ko ................................. 362/607 |
| 8,164,703 B2 * | 4/2012 | Cheng et al. .................... 349/58 |
| 8,243,223 B2 * | 8/2012 | Lee .................................. 349/58 |
| 2006/0291255 A1 * | 12/2006 | Tsai et al. ..................... 362/633 |
| 2008/0094535 A1 * | 4/2008 | Suh et al. ........................ 349/58 |

FOREIGN PATENT DOCUMENTS

| KR | 1020010045036 A | 6/2001 |
| KR | 1020070023211 A | 2/2007 |
| KR | 1020070119452 A | 12/2007 |

* cited by examiner

*Primary Examiner* — David J Makiya
(74) *Attorney, Agent, or Firm* — Innovation Counsel LLP

(57) ABSTRACT

A display apparatus includes a light guide plate guiding a light, a light source arranged in a side portion of the light guide plate to generate the light, a display panel receiving the light from the light guide plate to display an image, a frame including a sidewall and a support part extended from the sidewall to support the display panel, and an optical member arranged between the light guide plate and the display panel to control a path of the light exiting from the light guide plate. The optical member includes a first side portion and a second side portion, a side surface of the first side portion faces a side surface of the support part, and the second side portion is positioned between the support part and the light guide plate.

19 Claims, 9 Drawing Sheets

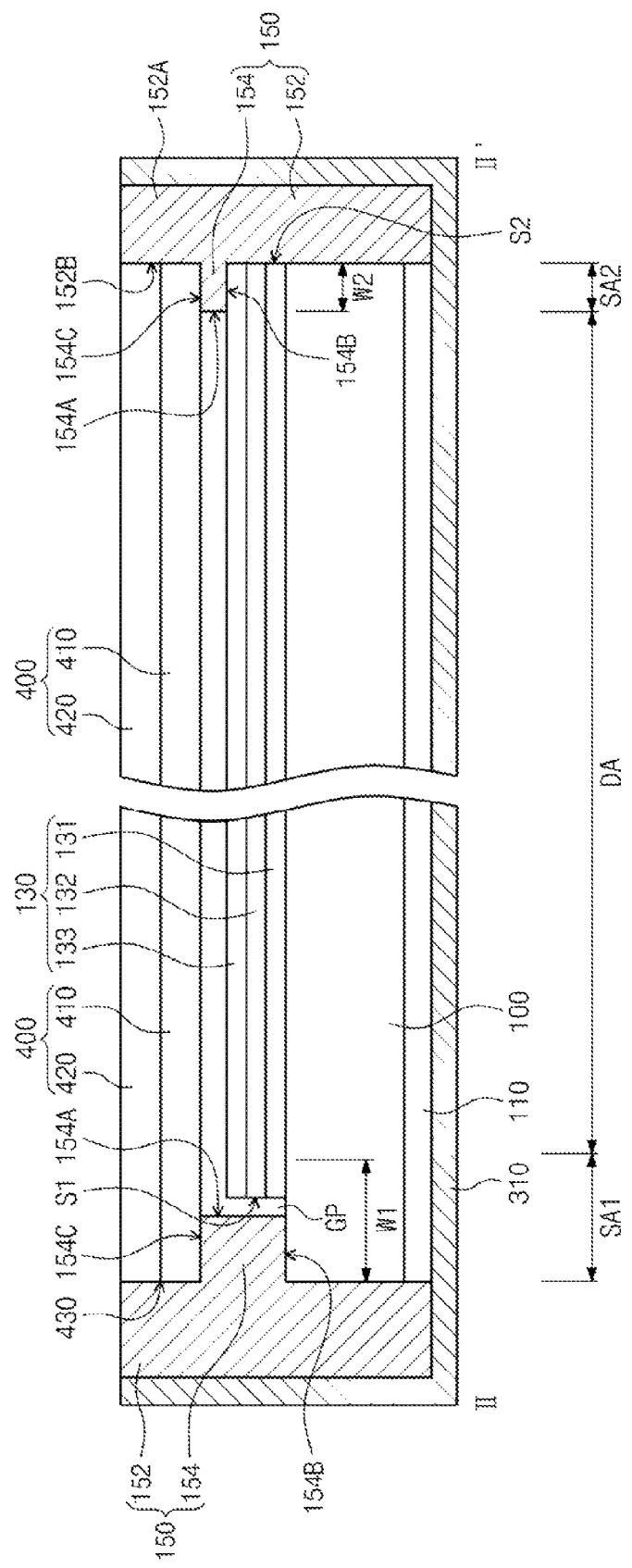

BACKLIGHT ASSEMBLY AND DISPLAY APPARATUS HAVING THE SAME

CROSS-REFERENCE TO RELATED APPLICATION

This application relies for priority upon Korean Patent Application No. 10-2010-0019112 filed on Mar. 3, 2010, the contents of which are herein incorporated by reference in its entirety.

BACKGROUND

1. Field of the Invention

The present invention relates to a backlight assembly and a display apparatus having the same. More particularly, a backlight assembly capable of being easily assembled and uniformly providing a light and a display apparatus having the backlight assembly are disclosed.

2. Description of the Related Art

In a display apparatus having a display area that displays an image and a peripheral area surrounding the display area to block a light, the size of the peripheral area of the display apparatus is reduced to increase the size of the display area relative to the total size of the display apparatus.

However, in the case of liquid crystal displays that utilize a light guide plate to guide light from a light source to a display panel, leakage light, which is light that travels to the display panel without passing through the light guide plate, can occur. As a width of the peripheral area is reduced, the amount of the leakage light increases, thereby causing deterioration in display quality of the liquid crystal display.

SUMMARY

Exemplary embodiments of the present invention provide a backlight assembly capable of being easily assembled and uniformly providing a light.

Exemplary embodiments of the present invention provide a display apparatus having the backlight assembly.

According to exemplary embodiments, a backlight assembly includes a light guide plate guiding a light, a light source arranged in a side portion of the light guide plate to generate the light, a display panel receiving the light from the light guide plate to display an image, a frame including a sidewall and a support part extending from the sidewall to support the display panel, and an optical member arranged between the light guide plate and the display panel to control a path of the light exiting from the light guide plate.

The optical member includes a first side portion and a second side portion, a side surface of the first side portion faces a side surface of the support part, and the second side portion is positioned between the support part and the light guide plate.

According to exemplary embodiments, a display apparatus includes a light source, a display panel, a light guide plate, a frame, and an optical member.

The light guide plate guides a light, the light source is arranged in a side portion of the light guide plate to generate the light, and the display panel receives the light from the light guide plate to display an image. The frame includes a sidewall and a support part extending from the sidewall to support the display panel, and the optical member is arranged between the light guide plate and the display panel to control a path of the light exiting from the light guide plate.

The optical member includes a first side portion and a second side portion, a side surface of the first side portion faces a side surface of the support part, and the second side portion is positioned between the support part and the light guide plate.

According to exemplary embodiments, a display apparatus includes a light guide plate guiding a light, a light source arranged in a side portion of the light guide plate to generate the light, a display panel receiving the light from the light guide plate to display an image, a frame including a sidewall and a support part extending from the sidewall to support the display panel, and an optical member arranged between the light guide plate and the display panel to control a path of the light exiting from the light guide plate.

The display panel includes a display area and a peripheral area having a first peripheral area and a second peripheral area. The first peripheral area has a width that is larger than a width of the second peripheral area in a plan view.

The optical member includes a first side portion corresponding to the first peripheral area, a second side portion corresponding to the second peripheral area, a first protruding portion protruded from the first side portion, and a second protruding portion protruded from the second side portion. The second protruding portion has a protruded length that is shorter than a protruded length of the first protruding portion in a plan view.

In addition, the sidewall is provided with a first coupling recess coupled with the first protruding portion and a second coupling recess coupled with the second protruding portion.

According to the above, the display apparatus includes the display panel and the backlight assembly, and the optical member is placed in the backlight assembly either in an insert structure or a mount structure according to the width of the peripheral area of the display panel. The mount structure has an advantage in easy assembling of the backlight assembly and the insert structure has an advantage in blocking a leakage light causing deterioration in display quality. Therefore, when placing the optical member in the backlight assembly, the display apparatus may have improved display quality and a structure capable of being easily assembled by employing both of the mount structure and the insert structure.

BRIEF DESCRIPTION OF THE DRAWINGS

The above and other advantages will become readily apparent by reference to the following detailed description when considered in conjunction with the accompanying drawings wherein:

FIG. 3 is a cross-sectional view taken along a line II-II' of FIG. 1;

DESCRIPTION OF THE EMBODIMENTS

Figure 1:
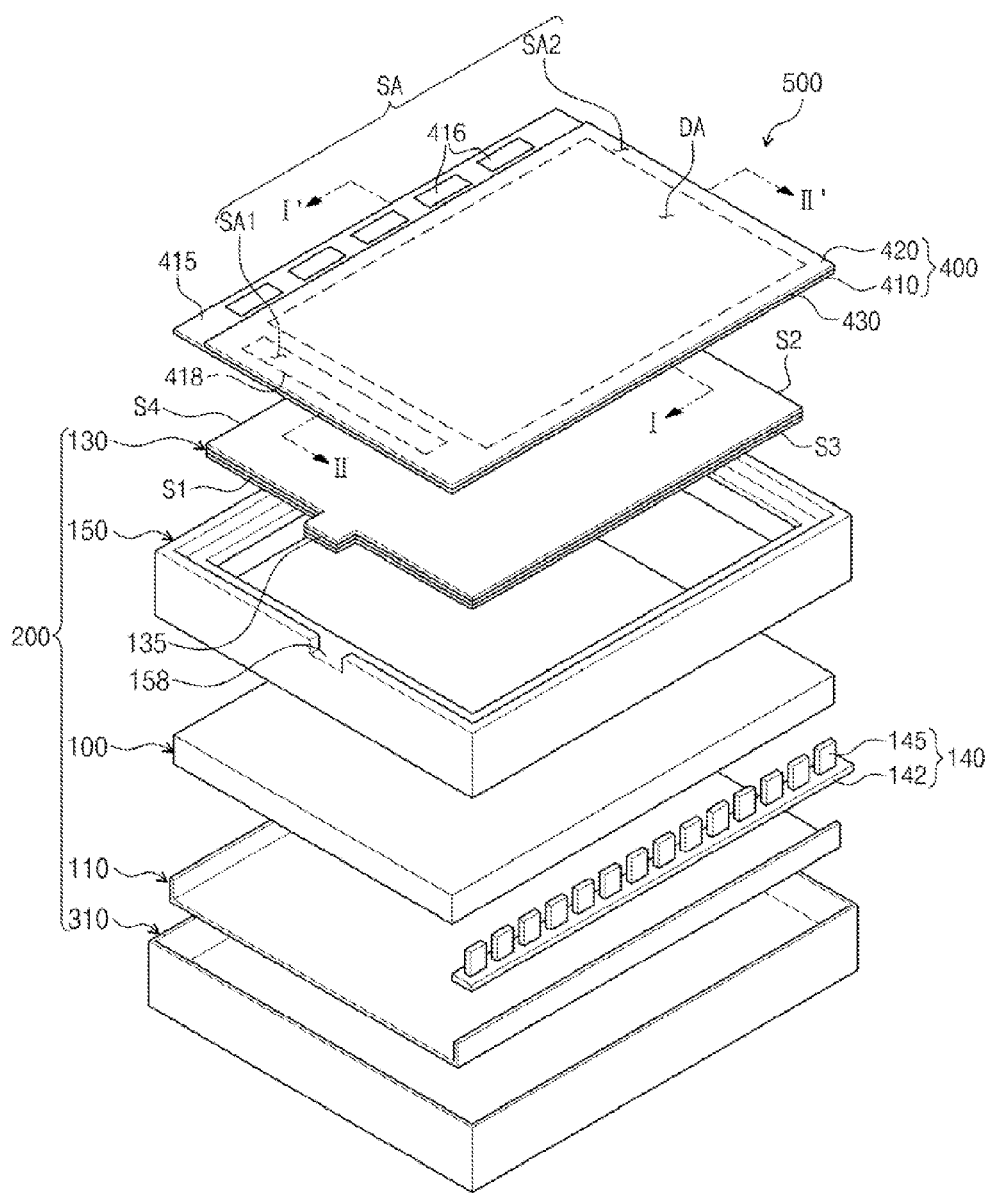
FIG. 1 is an exploded perspective view showing a display apparatus according to an exemplary embodiment.

It will be understood that when an element or layer is referred to as being "on", "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below, depending on the orientation. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments will be explained in detail with reference to the accompanying drawings.

Figure 2:
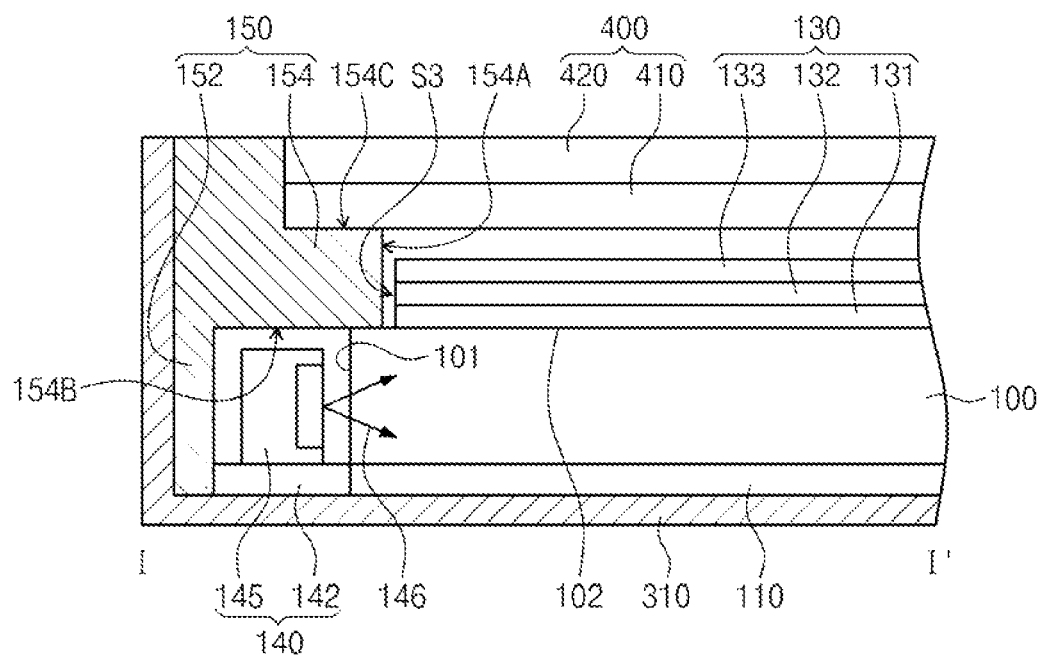
FIG. 2 is a cross-sectional view taken along a line I-I' of FIG. 1.

FIG. 1 is an exploded perspective view showing a display apparatus according to an exemplary embodiment, and FIG. 2 is a cross-sectional view taken along a line I-I' of FIG. 1.

Referring to FIGS. 1 and 2, a display apparatus 500 includes a backlight assembly 200 and a display panel 400 that receives a light from the backlight assembly 200 to display an image. In the present exemplary embodiment, the display apparatus 500 may be a liquid crystal display.

The backlight assembly 200 includes a light source part 140, a light guide plate 100, an optical member 130, a reflective plate 110, a frame 150, and a bottom chassis 310.

The bottom chassis 310 includes a bottom part and sidewalls extended from the bottom part to contain the light source part 140, the light guide plate 100, the optical member 130, the reflective plate 110, and the frame 150. More particularly, the reflective plate 110, the light guide plate 100, the optical member 130, and the display panel 400 are sequentially disposed on the bottom part of the bottom chassis 310. The frame 150 is inserted into bottom chassis 310 so that the outside of the sidewalls of the frame 150 are adjacent to the inside of the sidewalls of the bottom chassis 310. The light source part 140 is positioned adjacent to an incident surface 101 corresponding to one side portion of the light guide plate 100.

According to the present exemplary embodiment shown in FIGS. 1 and 2, the display apparatus 500 does not include a top chassis on the display panel 400 and coupled with the bottom chassis 310. Thus, the thickness of the display apparatus 500, i.e. the width from the back of the display apparatus 500 to the top face of the display panel 400, may be decreased. Although not shown in FIGS. 1 and 2, an entire surface of the display panel 400 may be exposed to the exterior of the display apparatus 500 because the display apparatus 500 does not employ the top chassis. The display panel 400 may be fixed to the bottom chassis 310 using, for example, a bonding member, which will be described in more detail below.

The light source part 140 generates light 146 that is used to display the image on the display panel 400. The light source part 140 includes a plurality of light sources 145 that are typically linearly arranged along a printed circuit board 142 that is arranged in parallel to the incident surface of the light guide plate 100. The light sources 145 are each electrically connected to the printed circuit board 142. Each of the light sources 145 is typically a light emitting diode, but is not be limited thereto, and light may be provided by, for example, a cold cathode fluorescent lamp having a shape that extends along the one side portion of the light guide plate 100 that is the incident surface 101.

The light guide plate 100 is contained in the bottom chassis 310 and receives the light 146 generated from the light source part 140 to guide the light 146 to the display panel 400. In detail, the light 146 is provided to the light guide plate 100 through the incident surface 101, and the light guide plate 100 guides the light 146 to the display panel 400 through an exit surface 102 on the light guide plate 100. Although not shown in FIGS. 1 and 2, the light guide plate 100 may further include, for example, a light guide pattern arranged on a rear surface of the light guide plate 100 that reflects the light 146 to the display panel 400 through exit surface 102.

The optical member 130 is disposed between the light guide plate 100 and the display panel 400 to control the path of the light exiting through the exit surface 102 of the light guide plate 100. The optical member 130 may include a plurality of optical sheets.

For instance, the optical member 130 may include a first optical sheet 131, a second optical sheet 132, and a third optical sheet 133 that are sequentially stacked on the light guide plate 100. In this case, at least one of the first to third optical sheets 131, 132, and 133 may be a diffusion sheet to diffuse the light exiting through the exit surface 102. At least one of the first to third optical sheets 131, 132, and 133 may be a prism sheet to condense the light exiting through the exit surface 102, to thereby improve the brightness at the front of the display apparatus 500. In addition, at least one of the first to third optical sheets 131, 132, and 133 may be a reflective polarizing sheet to reflect or transmit the light exiting through the exit surface 102 according to the vibration direction of the light.

Figure 4A:
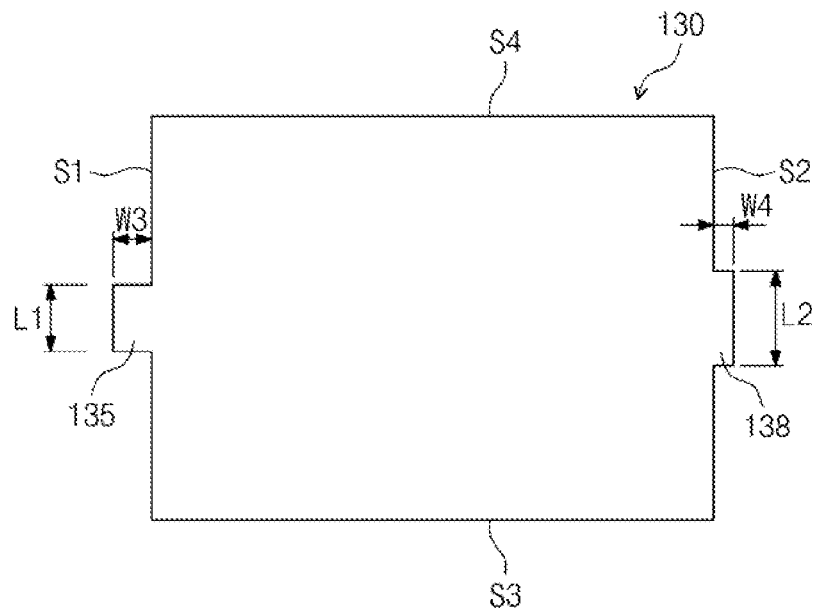
FIG. 4A is a plan view showing an optical member of FIG. 1.

Referring to FIG. 1 and FIG. 4A, the optical member 130 includes a first protruding portion 135 and a second protruding portion 138. For the convenience of explanation, side portions of the optical member 130 are referred to as a first side portion S1, a second side portion S2 that faces the first side portion S1, a third side portion S3 connecting the first side portion S1 with the second side portion S2, and a fourth side portion S4 that faces the third side portion S3. The first protruding portion 135 is protruded from the first side portion S1 and the second protruding portion 138 is protruded from the second side portion S2. The first protruding portion 135 is coupled with a first coupling recess 158 that is formed by partially removing the sidewall of the frame 150. The second protruding portion 138 is coupled with a second coupling recess 155 (shown in FIG. 5B) that is formed by partially removing the sidewall of the frame 150.

The reflective plate 110 includes a material, such as, for example, polyethylene terephthalate (PET) or aluminum, that reflects light. The reflective plate 110 is arranged on the bottom part of the bottom chassis 310 to reflect light generated from the light source part 140 toward the display panel 400. Therefore, light that is not guided to the display panel 400 by the light guide plate 100 may be provided to the display panel 400 by the reflective plate 110.

The frame 150 is contained in the bottom chassis 310 and supports various elements, such as guide plate 100, optical member 130 and display panel 400, of the display apparatus 500 that are contained in the bottom chassis 310. In particular, in the exemplary embodiment shown in FIG. 2, the frame 150 includes a frame sidewall 152 and a support part 154 that extends from the frame sidewall 152 toward the interior of the frame 150 in a direction that is substantially perpendicular to the frame sidewall 152. The frame sidewall 152 is fixed to the bottom part of the bottom chassis 310. An end portion of the light guide plate 100 is inserted under a lower surface 154B of the support part 154. The support part 154 extends far enough into the interior of the frame 150 so that the light source part 140 and incident surface 101 of the light guide plate 100 are underneath the support part 154

FIG. 1 and FIG. 2 shows side portion S3 of optical member 130. Optical member 130 is positioned so that side portion S3 of optical member 130 faces a side surface 154A of the support part 154 with, as will be described in more detail below with respect to FIG. 3, a gap between the side portion S3 and the side surface 154A. The display panel 400 is arranged on the support part 154 so that a peripheral edge portion of the bottom surface of display panel 400 is positioned on the upper surface 154C of support part 154. A side portion 430 of display panel 400 is adjacent to an upper side surface 152B of an upper portion 152A of sidewall 152. Thus, the display panel 400 may be spaced apart from the optical member 130 and the light guide plate 100 by the support part 154.

According to the present exemplary embodiment, the display panel 400 receives light from the backlight assembly 200 and displays an image. The display panel 400 includes a display area DA that displays the image and a peripheral area SA that surrounds the display area DA.

In the present exemplary embodiment, the display panel 400 may be, for example, a liquid crystal display panel. The display panel 400 includes a first substrate 410, a second substrate 420 that faces the first substrate 410, and a liquid crystal layer (not shown) disposed between the first substrate 410 and the second substrate 420.

The first substrate 410 may include a plurality of pixel electrodes (not shown) arranged in the display area DA, and a plurality of thin film transistors electrically connected to the pixel electrodes in a one-to-one correspondence. Each thin film transistor switches on in response to a driving signal provided to each pixel electrode, and the pixel electrode receives a data signal provided from a data driver when the thin film transistor is turned on.

The second substrate 420 may include color filter layers that are positioned in a one-to-one correspondence with the pixel electrodes and an opposite electrode that forms an electric field with the pixel electrodes to control an alignment of liquid crystal molecules in the liquid crystal layer. Further, the second substrate 420 may include a light blocking layer (not shown) formed thereon on the area of the second substrate 420 that corresponds to the peripheral area SA. The light blocking layer may be made of conventional black-matrix materials. The light blocking layer blocks the light provided from the backlight assembly 200, and thus the light blocking layer differentiates the portion of the display panel that is the display area DA from the portion that is the peripheral area SA.

The first substrate 410 includes a bonding part 415 that is not covered by the second substrate 420 and is thus exposed to an exterior of display panel 400. The first substrate 410 includes data driving chips 416 that are arranged on the bonding part 415 to apply the data signal to the thin film transistors. The peripheral area SA may be divided into a first peripheral area SA1 and a second peripheral area SA2 facing each other on opposite sides of the display area DA. The first substrate 410 may include a gate driver 418 positioned in the first peripheral area SA1. The gate driver 418 may be directly integrated onto the first substrate 410 to apply a gate signal to the thin film transistors. When the gate driver 418 is formed in the first peripheral area SA1, the first peripheral area SA1 may have a width that is larger than a width of the second peripheral area SA2, to accommodate the size of the gate driver 418.

The arrangement used for coupling the optical member 130 with the frame 150 may differ depending on the structure of the display panel 400. For example, in the exemplary embodiment shown in FIG. 1, the first side portion S1 of optical member 130 is positioned to correspond to the position of the first peripheral area SA1, the second side portion S2 is positioned to correspond to the position of the second peripheral area SA2, the third side portion S3 is positioned to correspond to the position of the light source part 140.

The first side portion S1 of optical member 130 is positioned so that it is over a portion of the light guide plate 100 instead of being inserted into the lower surface 154B of the support part 154 of the frame 150, and the second side portion S2 is inserted into the lower surface 154B of the support part

154. More detailed description of the above will be described with reference to FIGS. 3, 4A, 4B, 5A, and 5B.

FIG. 3 is a cross-sectional view taken along a line II-II' of FIG. 1 and shows a side portion S3 of optical member 130.

Referring to FIG. 3, the end portion of the light guide plate 100 is inserted into the lower surface 154B of the frame 150, under the lower surface 154B of support part 154, so that the light guide plate 100 is fixed to the bottom chassis 310 by the frame 150. In addition, in both of the ends of the display panel 400 that are shown in FIG. 3 the edge portions of the ends are arranged on a upper surface 154C the support part 154, the display panel 400 is fixed to the bottom chassis 310 by the frame 150.

The optical member 130 is located in the bottom chassis 310 between the display panel 400 and the light guide plate 100. In particular, the optical member 130 is placed on the light guide plate 100 so that the first side portion S1 is on top of the light guide plate 100 and, similar to the third side portion S3 shown in FIG. 2. The first side portion S1 and the third side portion S3 face a side surface 154A 154B of support part 154 instead of being inserted under the lower surface 154B of the support part 154. In addition, so that the optical member 130 may be easily placed on the light guide plate 100, and also to accommodate any thermal expansion of the optical member 130 which may occur due to changes in the ambient temperature, the first side portion S1 may be spaced apart from the frame 150, so that a gap GP is interposed therebetween.

In contrast to the arrangement of the frame 150 with respect to side portions S1 and S3 (FIG. 2) of optical member 130, as shown in FIG. 3, the second side portion S2 of the optical member 130 is inserted under the lower surface 154B of the support part 154. The support part 154 along the side of the frame 150 that accommodates side portion S2 of the optical member 130 under the lower surface 154B of the support part 154, is not as thick in the direction parallel to the side wall 152 of the frame 150, as the support part 154 along the side of the frame 150 that faces the side portions S1 and S3 of optical member 130, so that the second portion S2 of optical member 130 may be inserted under lower surface 154B of support part 154. Additionally, the frame 150 is not spaced apart from the second side portion S2, so there is no gap between the side portion S2 of optical member 130 and the side wall 152 of the frame 150.

As discussed above, the method of coupling the first side portion S1 with the frame 150 is different from the method of coupling the second side portion S2 with the frame 150. The method of coupling the first side portion S1 with the frame 150 is referred to herein as a "mount structure," and the method of coupling the second side portion S2 with the frame 150 is referred to herein as an "insert structure." The advantages of both of the mount structure and the insert structure may be obtained by employing the mount structure at the first side portion S1 and the insert structure at the second side portion S2.

By applying the insert structure to the second side portion S2, deterioration of the display quality of the display panel 400 as a result of leakage light that would travel to the display panel 400 through a gap GP without being guided by the light guide plate 100 can be prevented. That is, no gap occurs between the optical member 130 and the frame 150 at the second side portion S2. Thus, deterioration of the display quality of the display panel 400 due to leakage light may be prevented.

By applying the mount structure to the first side portion S1, the optical member 130 is disposed on the light guide plate 100, and it is relatively easy to mount the optical member 130 in the bottom chassis 310. On the other hand, where the insert structure is used, as with the first side portion S1, it is more difficult to mount the optical member 130 in the bottom chassis 310, or to separate the optical member 130 from the bottom chassis 310, compared to the mount structure because the optical member 130 is inserted between the support part 154 of the frame 150 and the light guide plate 100.

Specifically, in an embodiment in which both the first side portion S1 and the second side portion S2 are fixed to the bottom chassis 310 with the insert structure, the optical member 130 can be more difficult to separate from the bottom chassis 310 if it needs to be reworked. However, in the embodiment in which both the mount structure and the insert structure are used, if the first side portion S1 employing the mount structure is separated from the bottom chassis 310 before separating the second side portion S2 employing the insert structure from the bottom chassis 310, the optical member 130 may be relatively easily separated from the bottom chassis 310.

As described above with reference to FIG. 1, the first substrate 410 includes the gate driver 418 arranged in the first peripheral area SA1. The gate driver 418 is formed of a metal material that may reflect light, which may increase the amount of leakage light. However, as shown in FIG. 3, a first width W1 of the first peripheral area SA1 is larger than a second width W2 of the second peripheral area SA2, and the first width W1 is wide enough so that first peripheral area SA1, which includes a light blocking layer, is wide enough so that the gap GP is underneath the first peripheral area SA1 of the display panel 400. Consequently, the leakage light traveling to the display panel 400 through the gap GP may be sufficiently blocked by the first peripheral area SA1 having the larger width than the second peripheral area SA2, and deterioration of the display quality of the display panel 400 due to the leakage light may be prevented.

The second peripheral area SA2 has a width that is smaller than the first width W1 of the first peripheral area SA1, but the display quality is not deteriorated due to the leakage light on second side portion S2 because the second side portion S2 is inserted under support portion 154 of the frame 150 and there is no gap GP.

Figure 4B:
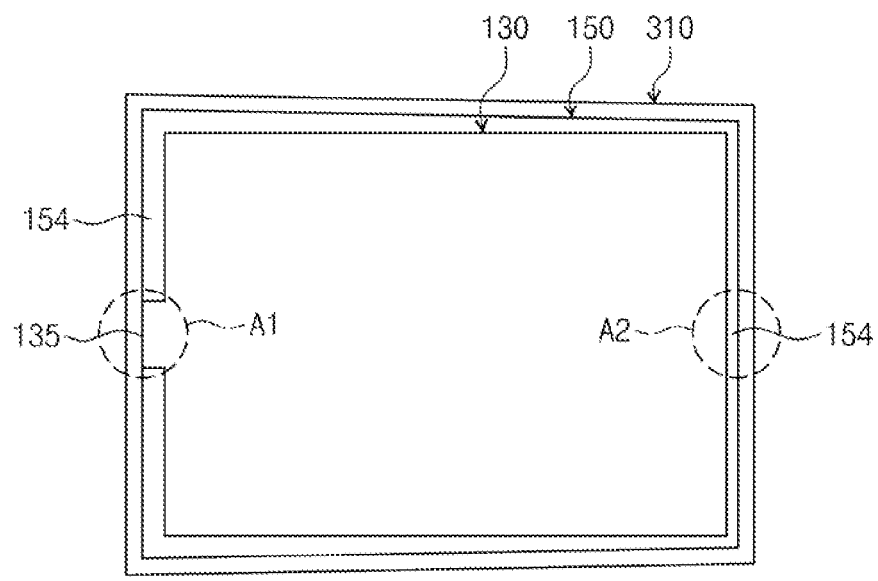
FIG. 4B is a plan view showing a state in which an optical member, a frame, and a bottom chassis are coupled with each other.

FIG. 4A is a plan view showing the optical member 130 of FIG. 1, and FIG. 4B is a plan view showing a state in which the optical member 130, the frame 150, and the bottom chassis 310 are coupled with each other.

Referring to FIGS. 4A and 4B, the first side portion S1 of the optical member 130 is arranged on the light guide plate (not shown) and the optical member 130 includes the first protruding portion 138 protruded from the first side portion S1, so that the first side portion S1 may be additionally supported by the first coupling recess 158 (under first protruding portion 138 in FIG. 4B) of frame 150, described in more detail below with respect to FIG. 5A.

Also, the second side portion S2 of the optical member 130 is inserted between the frame 150 and the light guide plate (not shown) and the optical member 130 includes the second protruding portion 138 protruded from the second side portion S2, so that the second side portion S2 may be supported more firmly by the frame 150, described in more detail below with respect to FIG. 5B.

Figure 5A:
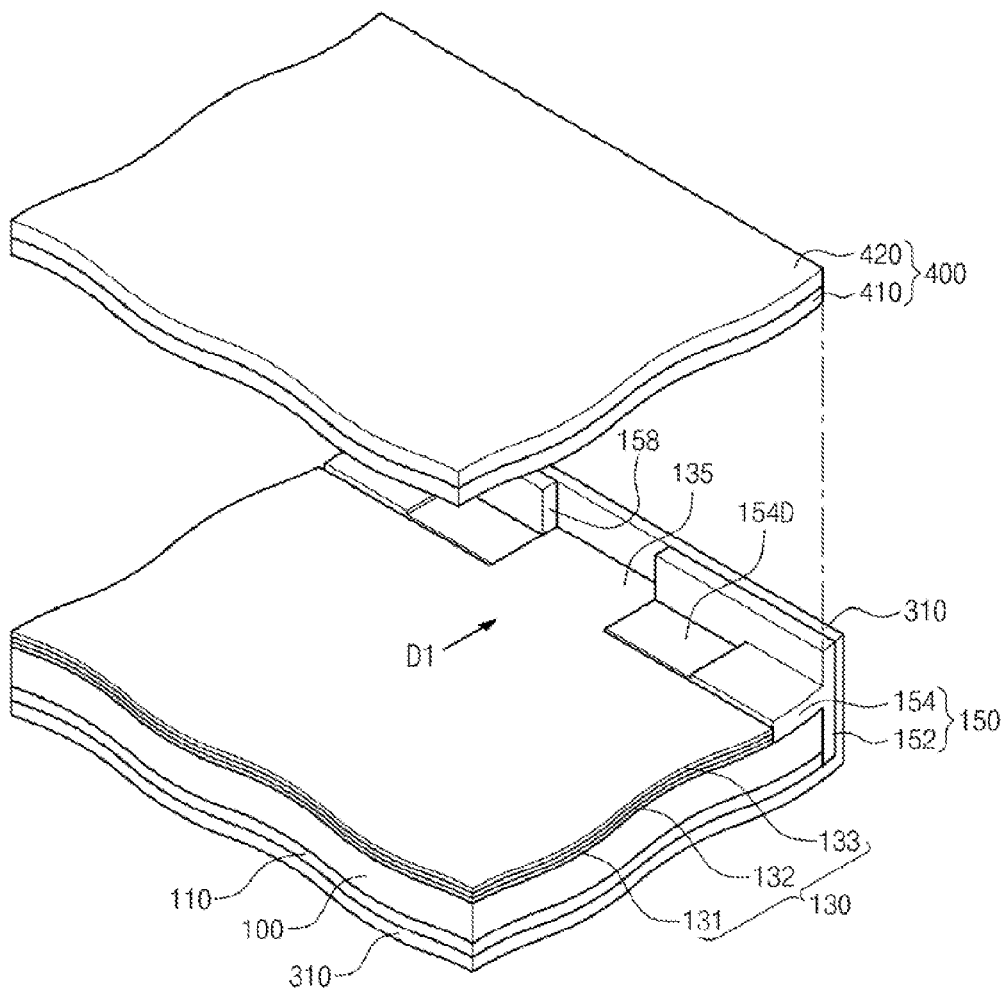
FIG. 5A is a partially enlarged perspective view showing a first area of FIG. 4B.
Figure 5B:
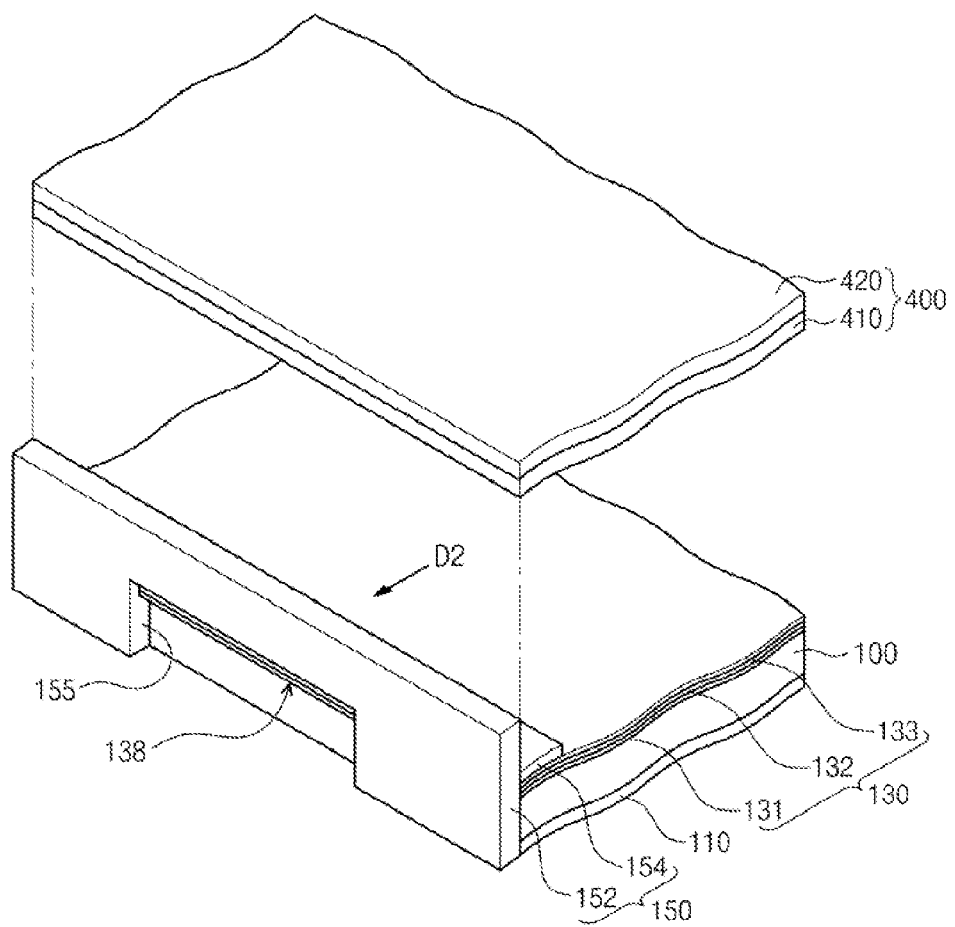
FIG. 5B is a partially enlarged perspective view showing a second area of FIG. 4B.

FIG. 5A is a partially enlarged perspective view showing a first area A1 of FIG. 4B, and FIG. 5B is a partially enlarged perspective view showing a second area A2 of FIG. 4B.

Referring to FIGS. 4B and 5A, the frame 150 includes a first coupling recess 158 formed by partially removing the sidewall 152 corresponding to a shape of the first protruding portion 135. Thus, the first protruding portion 135 may be inserted to the first coupling recess 158 along a first direction D1 while being arranged on the support part 154 of frame 150. An upper surface of the support part 154 has groove area 154D in where is adjacent to first coupling recess 158.

Referring to FIGS. 4B and 5B, the frame 150 includes a second coupling recess 155 formed by partially removing the sidewall 152 corresponding to a shape of the second protruding portion 138. Thus, the end portion of the optical member 130 is inserted between the support part 154 and the light guide plate 100 and the second protruding portion 138 is inserted to the second coupling recess 155 along a second direction D2, thereby firmly coupling the optical member 130 with the frame 150.

Referring again to FIG. 4A, the first protruding portion 135 has a rectangular shape with a third width W3 and a first length L1, and the second protruding portion 138 has a rectangular shape with a fourth width W4 and a second length L2. According to the method of coupling the first protruding portion 135 to the first coupling recess 158 and the second protruding portion 138 to the second coupling recess 155, the third width W3 is typically larger than a width of the support part 154, and for instance, may have a width that is equal to the width of the support part 154 and side wall 152. Also, the fourth width W4 may be equal to or smaller than a width of the sidewall 152, so that the second protruding portion 138 does not protrude out of the sidewall 152. To this end, it is desirable to adjust the second length L2 to increase an area in which the second protruding portion 138 makes contact with the sidewall 152.

Figure 6:
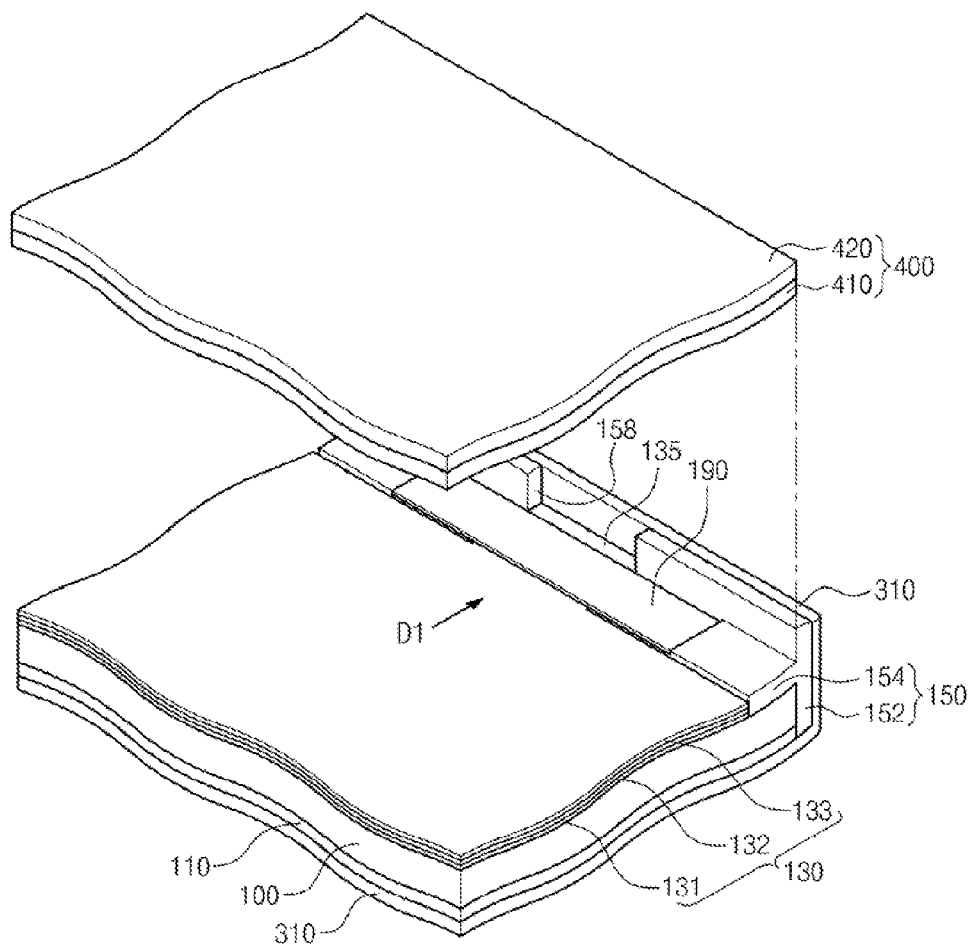
FIG. 6 is a perspective view showing a state in which an optical member, a frame, and a bottom chassis are coupled with each other according to another exemplary embodiment.

FIG. 6 is a perspective view showing a display apparatus in which an optical member 130, a frame 150, and a bottom chassis 310 are coupled with each other according to another exemplary embodiment. In FIG. 6, a structure in which the frame 150, the optical member 130, and the bottom chassis 310 are coupled with each other is the same as the structure shown in FIG. 5A except for a bonding member 190. Accordingly, in FIG. 6, the same reference numerals denote the same elements in FIGS. 1, 2, 3, 4A, 4B, 5A, and 5B, and thus the detailed descriptions of the same elements will be omitted.

Referring to FIG. 6, an optical member 130 includes a first protruding portion 135, and the first protruding portion 135 is coupled with a first coupling recess 158 formed through a sidewall 152 of a frame 150. Also, a bonding member 190 is attached to an upper surface of the first protruding portion 135 and an the groove area 154D of upper surface 154C of support part 154 of the frame 150, to bond the first protruding portion 135 to the support part 154. Therefore, the optical member 130 may be firmly coupled with the frame 150 by the bonding member 190.

In addition, when the bonding member 190 is separated from the support part 154 and the first protruding portion 135, the optical member 130 may be easily separated from a bottom chassis 310. Therefore, the optical member 130 may be easily re-assembled to the bottom chassis 310.

Figure 7:
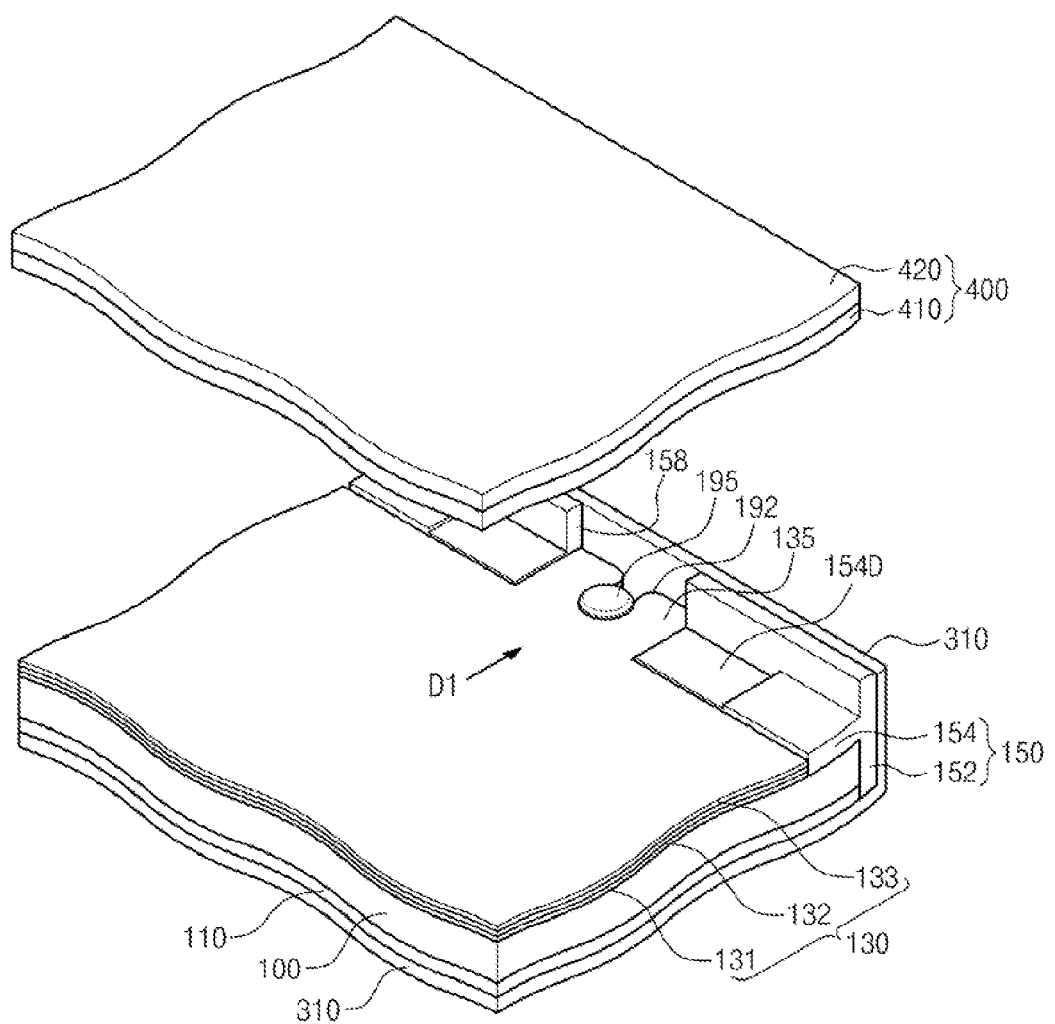
FIG. 7 is a perspective view showing a state in which an optical member, a frame, and a bottom chassis are coupled with each other according to another exemplary embodiment.

FIG. 7 is a perspective view showing display apparatus in which an optical member 130, a frame 150, and a bottom chassis 310 are coupled with each other according to another exemplary embodiment. In FIG. 7, a structure in which the frame 150, the optical member 150, and the bottom chassis 310 are coupled with each other is the same as the structure shown in FIG. 5A except for a third protruding portion 195 and a third coupling recess 192. Accordingly, in FIG. 7, the same reference numerals denote the same elements in FIGS. 1, 2, 3, 4A, 4B, 5A, and 5B, and thus the detailed descriptions of the same elements will be omitted.

Referring to FIG. 7, an optical member 130 includes a third coupling recess 192 and a frame 150 includes a third protruding portion 195. The third protruding portion 195 is protruded from a support part 154, the third coupling recess 192 is formed by partially removing a second protruding portion 135, and the third coupling recess 192 has a shape that is opened in one direction. Thus, when the optical member 130 is moved in a first direction D1, the third protruding portion 195 may be coupled with the third coupling recess 192 through the opened portion of the third coupling recess 192.

Also, when the optical member 130 moves in an opposite direction to the first direction D1, the third protruding portion 195 may be separated from the third coupling recess 192 through the opened portion, so that the optical member 130 may be easily separated from the bottom chassis 310.

Figure 8:
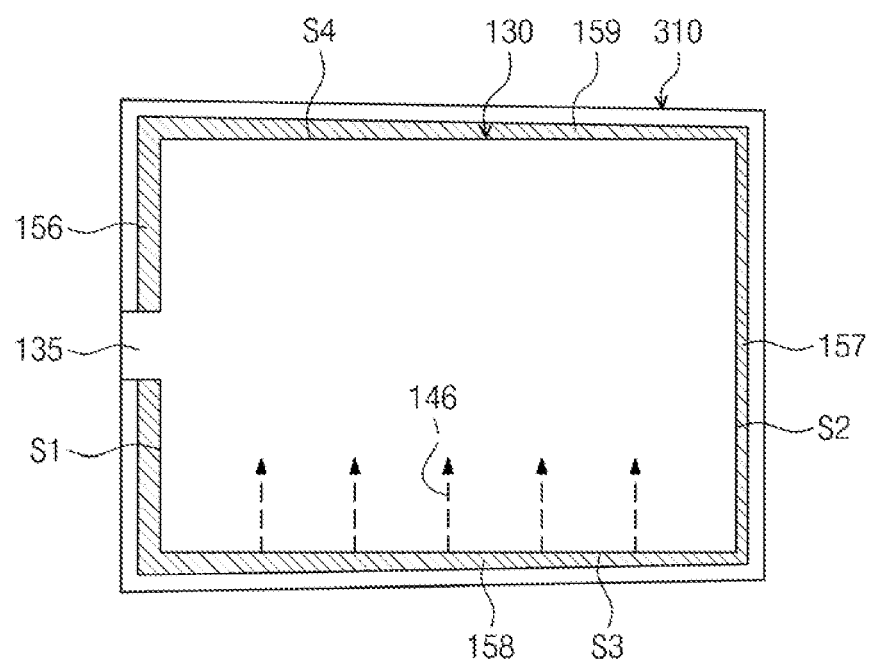
FIG. 8 is a plan view showing a state in which an optical member, a frame, and a bottom chassis are coupled with each other according to another exemplary embodiment.

FIG. 8 is a plan view showing a display apparatus in which an optical member 130, a frame 150, and a bottom chassis 310 are coupled with each other according to another exemplary embodiment. In the present exemplary embodiment, a structure in which the frame, the optical member, and the bottom chassis are coupled with each other is the same as the structure shown in FIG. 4B except for a frame. Thus, in FIG. 8, the same reference numerals denote the same elements in FIGS. 1, 2, 3, 4A, 4B, 5A, and 5B, and thus the detailed descriptions of the same elements will be omitted.

Referring to FIG. 8, unlike the frame 150 shown in FIG. 4B, a frame according to the present exemplary embodiment may be divided into a first frame 156, a second frame 157, a third frame 158, and a fourth frame 159.

The first frame 156 is arranged in parallel to a first side portion S1 of an optical member 130 and coupled with the first side portion S1, the second frame 157 is arranged in parallel to a second side portion S2 of the optical member 130 and coupled with the second side portion S2, the third frame 158 is arranged in parallel to a third side portion S3 of the optical member 130 and coupled with the third side portion S3, and the fourth frame 159 is arranged in parallel to a fourth side portion S4 of the optical member and coupled with the fourth side portion S4.

In the present exemplary embodiment, a light source part 140 (shown in FIG. 2) is arranged along the third side portion S3 to generate a light 146, and the first frame 156 surrounds the light source part 140 as same as shown in FIGS. 1 and 2. Therefore, it is desirable for the first frame 156 to have a white color that reflects the light in order to enhance an amount of the light generated from the light source part and provided to a light guide plate 100 (shown in FIG. 2).

However, for the second, third, and fourth frames 157, 158, and 159, a white color that is useful for the first frame 156, may increase the leakage light described earlier with reference to FIG. 3. Thus, it is desirable for each of the second, third, and fourth frames 157, 158, and 159 to have a color having a lower luminosity than the white color, such as a gray color, so that the second to fourth frames 157, 158, and 159 have a lower reflectivity than that of the first frame 156.

Although the exemplary embodiments have been described, it is understood that the present invention should not be limited to these exemplary embodiments but various changes and modifications can be made by one ordinary skilled in the art within the spirit and scope of the present disclosure.

What is claimed is:
1. A display apparatus comprising:
a light guide plate positioned to receive and guide light;
a light source located at a side portion of the light guide plate to generate the light;
a display panel configured to display an image using the light received from the light guide plate;

a frame comprising a sidewall and a support part, the support part extending from the sidewall to support the display panel; and an optical member located between the light guide plate and the display panel to control a path of the light exiting from the light guide plate, wherein the optical member comprises a first side portion and a second side portion located at opposite ends of the optical member and configured to couple with the support part differently, such that the first side portion faces a side surface of the support part and the second side portion is positioned under the support part, wherein a height of a lower surface of the support part corresponding to the second side portion is greater than a height of a lower surface of the support part corresponding to the first side portion, and a height of a upper surface of the support part corresponding to the first side portion equal to a height of a upper surface of the support part corresponding to the second side portion.

2. The display apparatus of claim 1, wherein the display panel comprises a display area for displaying the image and a peripheral area surrounding the display area, the peripheral area comprising a first peripheral area adjacent to the first side portion and a second peripheral area adjacent to the second side portion, the first peripheral area having a width that is larger than a width of the second peripheral area from a plan view.

3. The display apparatus of claim 2, wherein the display panel comprises:
    a pixel arranged in the display area to display the image; and
    a driver arranged in the first peripheral area configured to generate and apply a driving signal to the pixel to display the image.

4. The display apparatus of claim 2, wherein the optical member comprises:
    a first protruding portion protruded from the first side portion; and
    a second protruding portion protruded from the second side portion.

5. The display apparatus of claim 4, wherein the frame comprises a first coupling recess formed in the sidewall adjacent to the first side portion and a second coupling recess formed in the sidewall adjacent to the second side portion, the first coupling recess and second coupling recess positioned to correspond to respective locations of the first protruding portion and the second protruding portion, so as to allow the first protruding portion to be coupled with the first coupling recess and the second protruding portion with the second coupling recess.

6. The display apparatus of claim 5, further comprising a bonding member to bond the support part to the first protruding portion.

7. The display apparatus of claim 5, wherein the frame comprises a third protruding portion protruded from the support part and the optical member comprises a third coupling recess that is formed by partially removing the second protruding portion to allow the third protruding portion to be coupled with the third coupling recess.

8. The display apparatus of claim 5, wherein the first protruding portion has a length along a direction of the first side portion that is longer than a length of the second protruding portion along a direction of the second side portion from the plan view.

9. The display apparatus of claim 2, wherein the first side portion faces the second side portion, and the optical member comprises a third side portion adjacent to an incident surface of the light guide plate and the light source, the third side portion connecting the first side portion with the second side portion, and a fourth side portion facing the third side portion and connecting the first side portion with the second side portion.

10. The display apparatus of claim 9, wherein the light source comprises a plurality of light sources arranged along the incident surface.

11. The display apparatus of claim 10, wherein each of the plurality of light sources includes a light emitting diode.

12. The display apparatus of claim 9, wherein the frame comprises:
    a first frame extending along the first side portion;
    a second frame extending along the second side portion;
    a third frame extending along the third side portion to cover the light source; and
    a fourth frame extending along the fourth side portion,
    wherein the third frame has a reflectivity that is higher than a reflectivity of the first, second, and fourth frames.

13. The display apparatus of claim 12, wherein the third frame has a luminosity that is higher than a luminosity of each of the first, second, and fourth frames.

14. The display apparatus of claim 1, wherein the optical member comprises:
    a diffusion sheet for diffusing the light exiting from the light guide plate; and
    a prism sheet for condensing the exiting light.

15. The display apparatus of claim 14, wherein the optical member further comprises a reflective polarization sheet to reflect or transmit the exiting light according to a vibrating direction of the exiting light.

16. The display apparatus of claim 1, further comprising:
    a bottom chassis comprising a bottom portion and sidewalls extending from the bottom portion to contain the light source, the light guide plate, the display panel, and the optical member; and
    a reflection plate arranged between the bottom portion and the light guide plate,
    wherein at least one surface of the display panel is exposed.

17. The display apparatus of claim 1, wherein a side surface of the second side portion is in contact with the sidewall of the frame.

18. A backlight assembly comprising:
    a light guide plate positioned to receive and guide light;
    a light source located in a side portion of the light guide plate to generate the light;
    a display panel configured to display an image using the light received from the light guide plate;
    a frame comprising a sidewall and a support part extending from the sidewall to support the display panel; and
    an optical member arranged between the light guide plate and the display panel to control a path of the light exiting from the light guide plate,
    wherein the optical member comprises a first side portion and a second side portion located at opposite ends of the optical member and configured to couple with the support part differently such that the first side portion faces a side surface of the support part and the second side portion is positioned under the support part,
    wherein a height of a lower surface of the support part corresponding to the second side portion is greater than a height of a lower surface of the support part corresponding to the first side portion, and a height of a upper surface of the support part corresponding to the first side portion equal to a height of a upper surface of the support part corresponding to the second side portion.

19. The backlight assembly of claim 18, wherein the optical member comprises:
- a first protruding portion protruded from the first side portion; and
- a second protruding portion protruded from the second side portion, the second protruding portion having a second protruded length that is shorter than a first protruded length of the first protruding portion from a plan view,
- wherein the first protruding portion is configured to couple with a first coupling recess formed in the sidewall, and the second protruding portion is configured to couple with a second coupling recess formed in the sidewall.

* * * * *